United States Patent
Engel et al.

(10) Patent No.: US 6,519,636 B2
(45) Date of Patent: *Feb. 11, 2003

(54) EFFICIENT CLASSIFICATION, MANIPULATION, AND CONTROL OF NETWORK TRANSMISSIONS BY ASSOCIATING NETWORK FLOWS WITH RULE BASED FUNCTIONS

(75) Inventors: Robert Engel, Greenwich, CT (US); Tsipora P. Barzilai, Tel Aviv (IL); Dilip Dinkar Kandlur, Yorktown Heights, NY (US); Ashish Mehra, White Plains, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,376

(22) Filed: Oct. 28, 1998

(65) Prior Publication Data

US 2003/0005144 A1 Jan. 2, 2003

(51) Int. Cl.[7] .............................................. G06F 15/173
(52) U.S. Cl. ..................... 709/223; 709/203; 709/224; 709/231; 709/232; 709/233; 709/250; 370/229; 370/252
(58) Field of Search .............................. 709/200–203, 709/217–219, 223–225, 230–233, 236–239, 249–250; 713/200–201; 707/10, 101–104; 370/224–232, 252, 473

(56) References Cited

U.S. PATENT DOCUMENTS

| | | | | |
|---|---|---|---|---|
| 5,425,029 A | * | 6/1995 | Hluchyj et al. ............. | 370/235 |
| 5,568,487 A | * | 10/1996 | Sitbon et al. ................ | 709/230 |
| 5,682,534 A | * | 10/1997 | Kapoor et al. ............... | 709/203 |
| 5,727,002 A | * | 3/1998 | Miller et al. ................ | 709/237 |
| 5,822,524 A | * | 10/1998 | Chen et al. .................. | 709/203 |
| 5,854,841 A | * | 12/1998 | Nakata et al. ............... | 709/203 |
| 5,889,954 A | * | 3/1999 | Gessel et al. ................ | 709/223 |
| 5,903,724 A | * | 5/1999 | Takamoto et al. ........... | 709/200 |
| 6,021,440 A | * | 2/2000 | Post et al. ................... | 709/231 |
| 6,046,979 A | * | 4/2000 | Bauman ..................... | 370/229 |
| 6,061,796 A | * | 5/2000 | Chen et al. .................. | 709/225 |
| 6,269,467 B1 | * | 7/2001 | Chang et al. .................. | 716/1 |

OTHER PUBLICATIONS

Microsoft Press, "Computer Dictionary" (1997), pp. 207 and 348.*

Microsoft Press, "Computer Dictionary" (1997), pp. 114 and 466.*

* cited by examiner

*Primary Examiner*—Bharat Barot
(74) *Attorney, Agent, or Firm*—Louis J. Percello; Perman & Green, LLP

(57) ABSTRACT

A computer connected to one or more networks through appropriate network interfaces is used to classify, manipulate, and/or control communications, e.g., packets sent and/or received over the network by one or more applications executing in the computer. Each application is connected to the network through one or more sockets to enable this communication. The computer also comprises one or more rule sets of one or more rules. A socket set of one or more of the sockets is associated with only one of the rule sets. The rules in the rule set are used to control one or more of the packets communicated by the applications communicating over the socket(s) associated with the respective rule set. Rules can be added to the rule set, deleted from the rule set, or modified in order to classify, manipulate, and/or control the communication of the packets, e.g. to control the rate at which the packets are sent or to provide certain security functions.

21 Claims, 11 Drawing Sheets

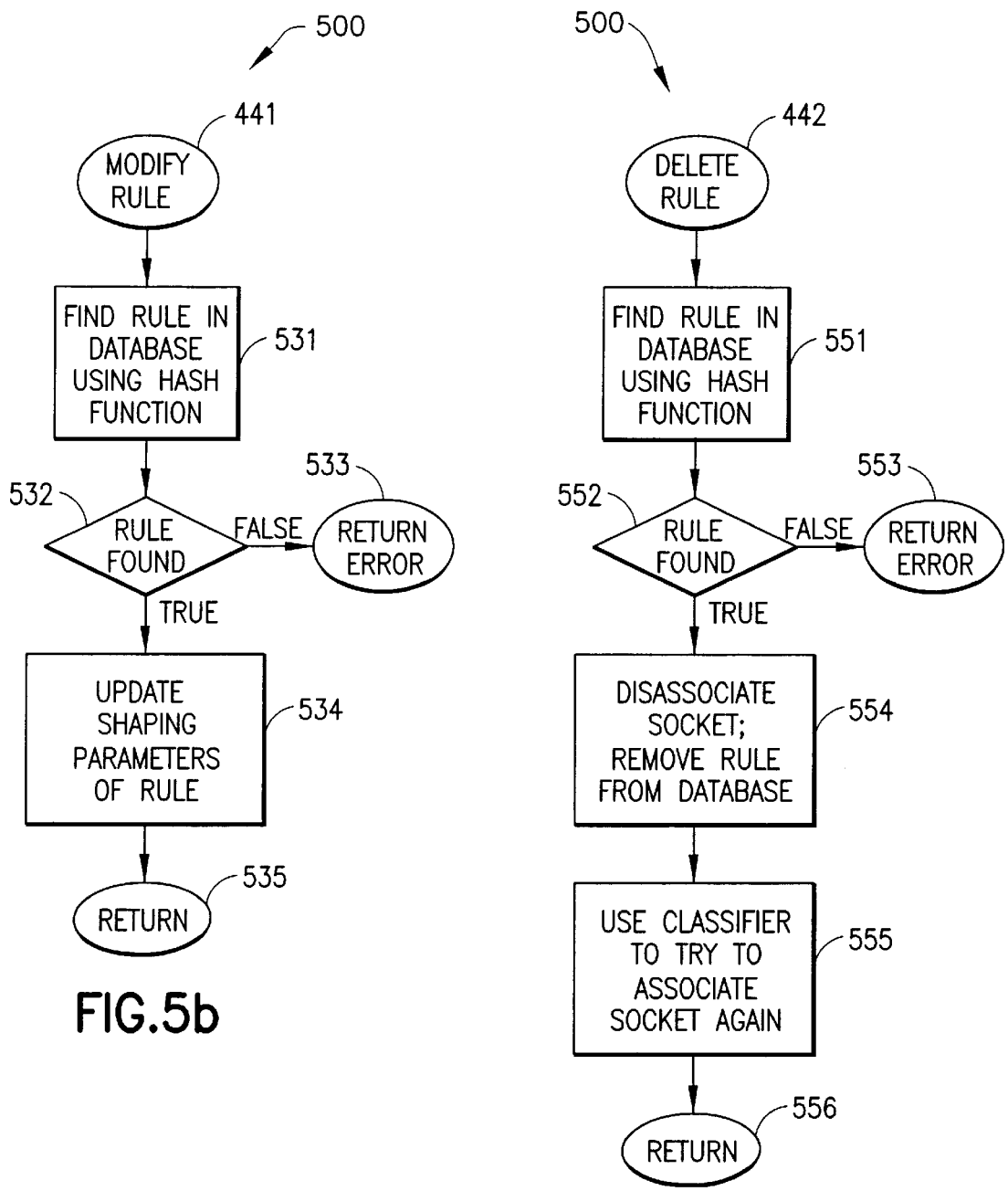

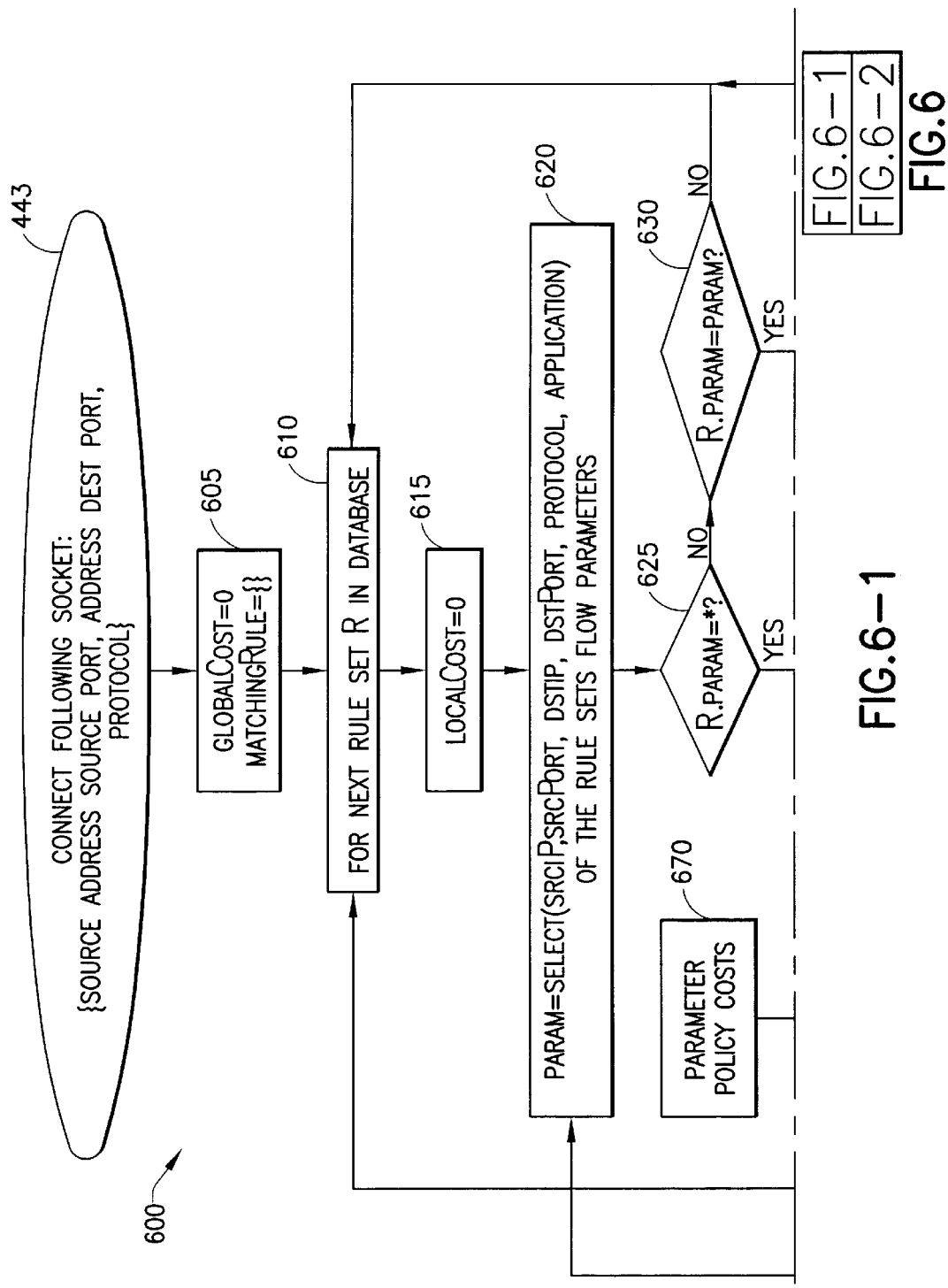

EFFICIENT CLASSIFICATION, MANIPULATION, AND CONTROL OF NETWORK TRANSMISSIONS BY ASSOCIATING NETWORK FLOWS WITH RULE BASED FUNCTIONS

FIELD OF THE INVENTION

This invention relates to the field of identifying and controlling packets sent to and received from a networking environment, particularly one or more of the following: the internet, intranet, cable, and any other of packet switching networks. More specifically, the invention relates to a way to control how packets are transmitted from an application to the network and how packets received from the network are passed to the application.

BACKGROUND OF THE INVENTION

Applications using the Internet for transmission of data and media have huge business opportunities and controlling how information is sent from an application to a network and passed from a network to an application is a critical element. For electronic business it is important that data is manipulated before it is sent to an untrusted network and manipulated after it has left the untrusted network such that one or more of privacy, authenticity and data integrity is assured. For real time information like audio and/or video, it is more important to be able to guarantee an acceptable level of service to make it a successful business. For pervasive computing applications it is critically important that a new class of user machines, such as thin clients and application-specific Tier 0 devices, with widely varying resource capabilities are able to avail of Internet application services without excessive demands on their limited resources.

"Internet Media" transmission includes sending media packets (containing any of the following: n-dimensional images, animation, music, text, movies, video shots, still pictures, voice, data, etc.) over packet switching networks (e.g., a wide area network—WAN—and/or local area network—LAYN) between two or more computers with special application software. Internet Telephony is a particular version of Internet Media where packets contain voice information (and sometimes video information). When the voice processed by an input device is captured at a source computer, an application running on the source computer will transform the continuous voice analog signals into a series of discrete digitally compressed packets. There are some well known industry standards to define this transformation process and the format of these discrete (often digitally compressed) packets, for example, PCM, GSM, G.723, etc.

There are other known processes defined by standards (e.g., IP, UDP, TCP and RTP protocols) to augment the packets with necessary headers and trailers so that these packets can travel over the common packet switching network(s) to a destination computer. With these headers and trailers, packets usually travel over the packet switching network(s) independently. At the destination computer, arriving packets are stored in a buffer and are then transformed back into the form which is close to the original analog signal. The same industry standard (e.g., PCM, GSM, G.723, etc.) defines this transformation.

Enhancing a network transmission over a non trusted network with security features comprises but is not limited to any one or more of the following:

message integrity allows a recipient of a transmission to verify that the contents of the transmission have not been altered by a third party. It usually involves the computation of a Message Authentication Code (MAC) that is computed over the content of the transmission.

privacy guarantees that no unauthorized party can get access to the information. It involves encryption at the sending end and decryption at the receiving end.

authentication allows a recipient of a transmission to verify the ID of the sender.

STATEMENT OF PROBLEMS WITH THE PRIOR ART

Quality is a serious problem in sending media over packet switching networks, including Internet and Intranets. This problem comes from the two general characteristics of packet switching networks, namely: (A) most users are connected to the Internet over a low bandwidth link (e.g. dialup over a phone line to the Internet Service Provider); (B) a large number of users may connect to the Internet using heterogeneous resource-limited machines and devices, e.g., thin clients, handheld devices, set-top boxes, and Web appliances; (C) currently there is no standard that is generally implemented and allows to differentiate priorities of real time traffic from non real time traffic.

Generally, the prior art systems do not control well how packets are transmitted from an application to the network and/or how packets are received from the network and passed to the application. Here control includes but is not limited to the following: controlling the temporal spacing and the temporal frequency of packets, controlling the security features (encryption, message integrity, authentication) of one or more packets. This lack of control causes several problems, among them packet transmission delay.

For two-way Internet media transmission, long delays are fatal and packet losses also have an impact on the quality of the transmission. Delays occur when packets are buffered, which happens usually in routers, where packets from different incoming links arrive at the same time and have to be multiplexed on fewer or slower outgoing links.

One prior art system for reducing delays is describe in RFC 2205 "Resource ReSerVation Protocol". It defines a protocol to establish a reservation for specific transmission sessions on a given path. This enables routers to give packets belonging to a reserved flow a higher priority. The consequence is that they can be transmitted from one router to the next with little or no queuing. This reduces the delay for such packets significantly. The problem with this prior art system is that it doesn't scale very well, since the router needs to store the priority for all of these sessions. In addition, there is a current lack of a universally accepted policy that restricts everybody from establishing a reservation for a session.

Another prior art system is described in the IETF draft "Differentiated Services". It defines a more scaleable way to give different priorities to different flows. However, this technique is not yet mature enough to be standardized, let alone to be implemented.

Both of the prior art systems are implemented on network equipment (routers) within the network. Since the Internet is not one homogeneous, centrally administered network but comprises many different networks that are under the administrative control of different organizations, it is currently not possible for an end system to obtain a better than best effort quality over the Internet.

An example of a typical prior art networking system 100 for transmitting real time information, including voice and data, and non real time information, is shown as a block diagram in FIG. 1. The networking system 100 comprises a plurality of computers (generally 160) that are connected to one or more networks 130 through well known network connectors such as modems and/or LAN adapters 150. The computers 160 typically can be any generally known computer system, such as a personal computer (like an IBM ThinkPad) or workstation (like an IBM RS6000), or a device with possibly limited memory and a possibly less powerful central processing unit like a set-top box, a hand held device such as a Palm Pilot, or other Web-based application devices. For a one way communication, one computer 160 would be the source computer 160S originating the transmission of information and one or more of the computers 160 would be the destination computer 160D that would receive the information. However, in many applications, both the source computer 160S and the destination computer 160D functions are contained in a single computer, e.g. 160, that can perform both transmission, sending and receiving functions, to enable point to point two way, one to many, and/or many to many communications. The computers 160 will have well known input and output devices like microphones 131, speakers 132, keyboards, mice, cameras, video recorders, screens, recorders, music instruments, pen inputs, touch screens (not shown), etc. The combination of one or more multimedia interfaces 133, e.g. a sound card and/or video card 133, network interface software 134, and one or more network connections 150 converts signals from an analog continuous form 135 to a digital (and typically compressed) packetized form 120. Through the network connector 150, the packets are exchanged over the networks 130 between the computers 160.

The computers 160 might also use a network client 195 (e.g. a World Wide Web browser, an ftp client and other well known clients) to interact with a network server 170 (e.g. a World Wide Web server, an ftp server and other well known servers). The computers 160 therefore behave as a client to the data server 170 and as source and/or destination in the media transmission between them (the server 170 and client 160).

The network(s) 130 can be any type of packet switching network which include but is (are) not limited to the Internet, intranets, extranets, wide area networks (WANs), local area networks (LANs), phone networks, and/or any combination or interconnection of such networks. Typically these networks comprise access points 140, routers 110, and network links (typically 175). Network links 175 connect these routers 110 and access points 140 to form the network 130. These routers 110, access points 140, and network links 175 are typically operated by one or more Internet service providers (ISP). Access points 140 are the gateways to outside world of the closed network. Various computers 160 can access the network 130 via access points 140 by well known connections including: dial-up connections, dedicated line connections, cable connections, satellite connections, and other forms of well known connections. The computers could also be attached to the network with a wireless interface based on transmission of radio waves, infrared and other well known interfaces.

Known standard protocols (IP protocol, PPP protocol, LAN protocol, etc.) support various computers 160 to exchange data and messages independently of the connection being used between the network connectors 150 and the access points 140. Particularly, User Diagram Protocol (UDP) and Real-Time Protocol (RTP) provide the ways for computers to exchange real-time Internet media packets over the network 130. Other known standard protocols (TCP protocol, HTTP protocol) are better suited for transmission of non real time information like data transmission.

In the example of FIG. 1, the destination computer 160D is receiving real time UDP/RTP packets 120 over the network 130. At the same time the destination computer 160 downloads data from the World Wide Web server 170. Since both flows of packets have the same destination, they merge at a merging point 190 either on a router 110 within the network or at the access point 140 that connects the Destination Computer 160D to the network 130. Merging the flows means that packets 120 and 180 are interleaved temporally. As it is usually not possible to give a higher priority to the real time packets, every packet will be put at the end of the merging buffer. This can add a significant delay to the packet transmission time and reduce the quality of the real time transmission to an intolerable level. Since the network is not under the control of the administrators/operators of the computers 160 and 170, the quality of the media transmission 120 can not be controlled is usually not acceptable.

Security is a addressed in a prior art system called the Secure Socket Layer protocol (SSL). It is also known under the name Transport Layer Security (TLS). It allows the provision of security features to an individual TCP connection. However, it uses a specific API (Application Programmer Interface) that is different from the interface usually used to transmit and receive data to/from the network. This means that existing applications that want to make use of security features need to be modified to use this specific API. Since SSL is based on a reliable transport mechanism it is only specified for TCP transmissions.

Another standard dealing with security issues is called IP Security (IPsec). It defines how to setup a security association or a secure tunnel between two points connected to a network. Packets are classified for transmission over the tunnel based on source port, destination port, source address, destination address, and the protocol. However, it is not possible to make the classification dependent on a process/thread group or ID or a specific sending or receiving application. Associating a packet with the required security features is usually done using a filter that finds the required security features based on a lookup of the classification parameters of the packet. This can be a computationally expensive process.

OBJECTS OF THE INVENTION

An object of this invention is a general way to efficiently control and manipulate packets sent to the network and pass packets received from the network to the application based upon one or more criteria.

An object of this invention is a general way to efficiently control and manipulate packets sent to the network and pass packets received from the network to the application based upon one or more of the following criteria: packet source address, packet destination address, packet source port, packet destination port, protocol type of the packet, and the type of application that sends or receives the packet.

An object of this invention is a system and method to provide better quality to an end-to-end Internet media transmission between two points which are connected by one or more packet switching networks, by rate shaping all other transmissions that are destined to one of the two points.

An object of this invention is a system and method to reduce the delay, the delay variation, and the loss rate of an end-to-end Internet media transmission between two points which are connected by one or more packet switching networks and exchange other data as well by rate shaping all other transmission having the same destination.

An object of this invention is a system and method for a source computer, and a destination computer, to negotiate and determine an aggregate rate to which all transmission from the source computer to the destination computer is limited.

An object of this invention is a system and method that reduces the transmission delay variance and the packet loss rate of a transmission over one or more packet switched networks from a source to a destination computer that are attached to these networks by rate shaping the transmission at the source computer.

An object of this invention is a system and method to control the temporal spacing and frequency of packets sent to the network from an application and packets received from a network and sent to the application of a set of one or more network transmission sessions, according to an aggregate policy, so that all transmission sessions are treated alike and fair.

An object of the invention is to control encryption, authentication, and message integrity of packets sent to and received from the network based on an efficient lookup/association of the security features and the packets.

An object of the invention is to give similar security features to a specific set of packets sent to or received from the network.

An object of the invention is to give similar security features to a specific set of packets sent to or received from the network, that can be identified using one or more of the following: packet source address, packet destination address, packet source port, packet destination port, protocol type of the packet, and the type of the application that sends or receives the packet.

An object of the invention is to enhance a software application with features including but not limited to temporal spacing and frequency of packets and security like encryption, authentication and message integrity without having to modify the application.

SUMMARY OF THE INVENTION

This invention is a system and method for classifying, manipulating, and/or controlling communications, e.g., packets transmitted over a network. A computer, e.g. a server, connected to one or more networks contains applications that communicate over the network through a network interface by sending and receiving packets. Each application is connected to the network through one or more sockets to enable this communication. The computer also comprises one or more rule sets of one or more rules. A socket set of one or more of the sockets is associated with only one of the rule sets. The rules in the rule set are used to control one or more of the packets communicated by the applications communicating over the socket(s) associated with the respective rule set. In one preferred embodiment, the rules in the rule set can be added, modified and deleted to classify, manipulate, and/or control the communication of the packets, e.g. to control the rate at which the packets are sent or to provide certain security functions.

DETAILED DESCRIPTION OF THE INVENTION

Figure 1:
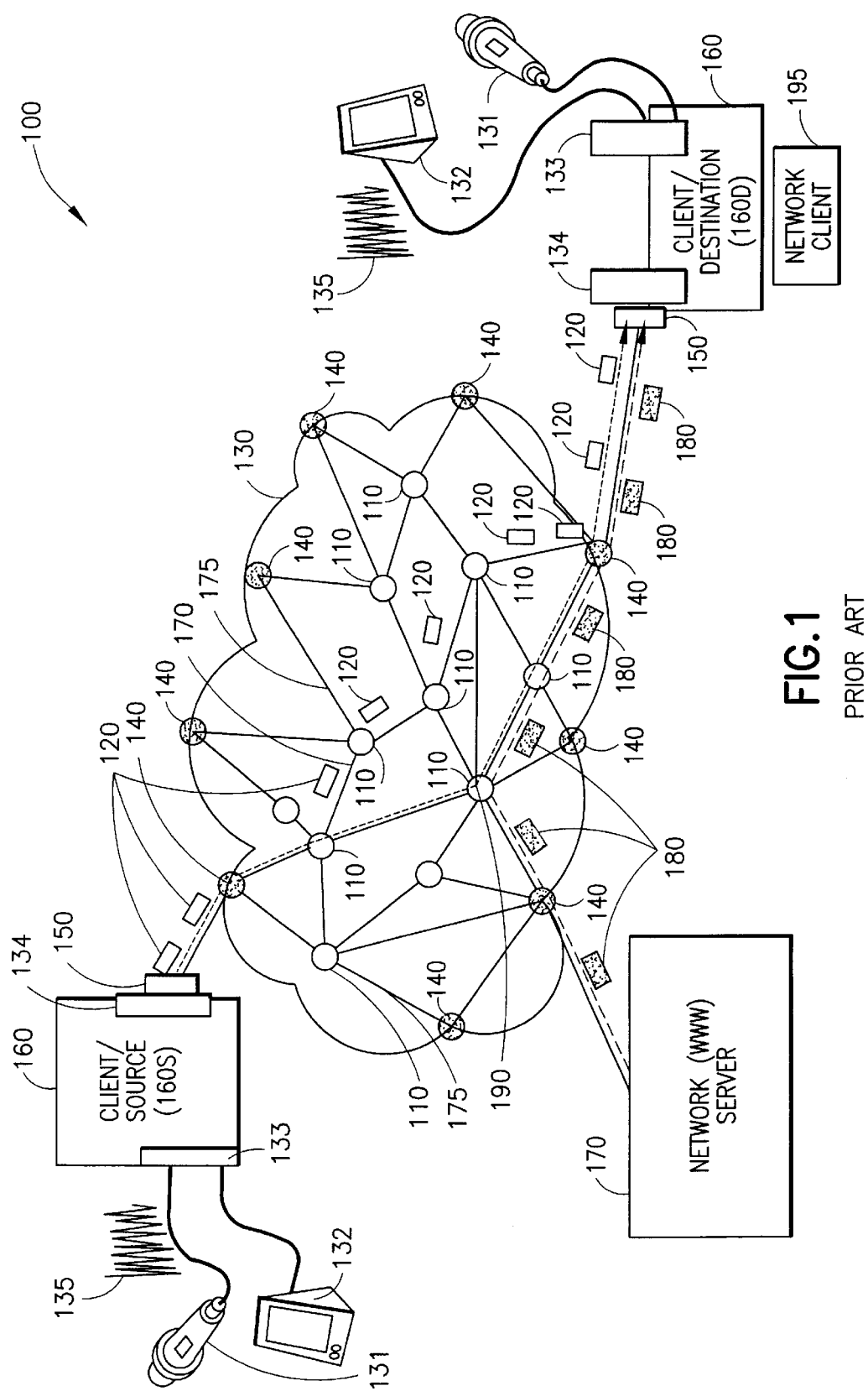
FIG. 1 is a block diagram of a prior art network.
Figure 2:
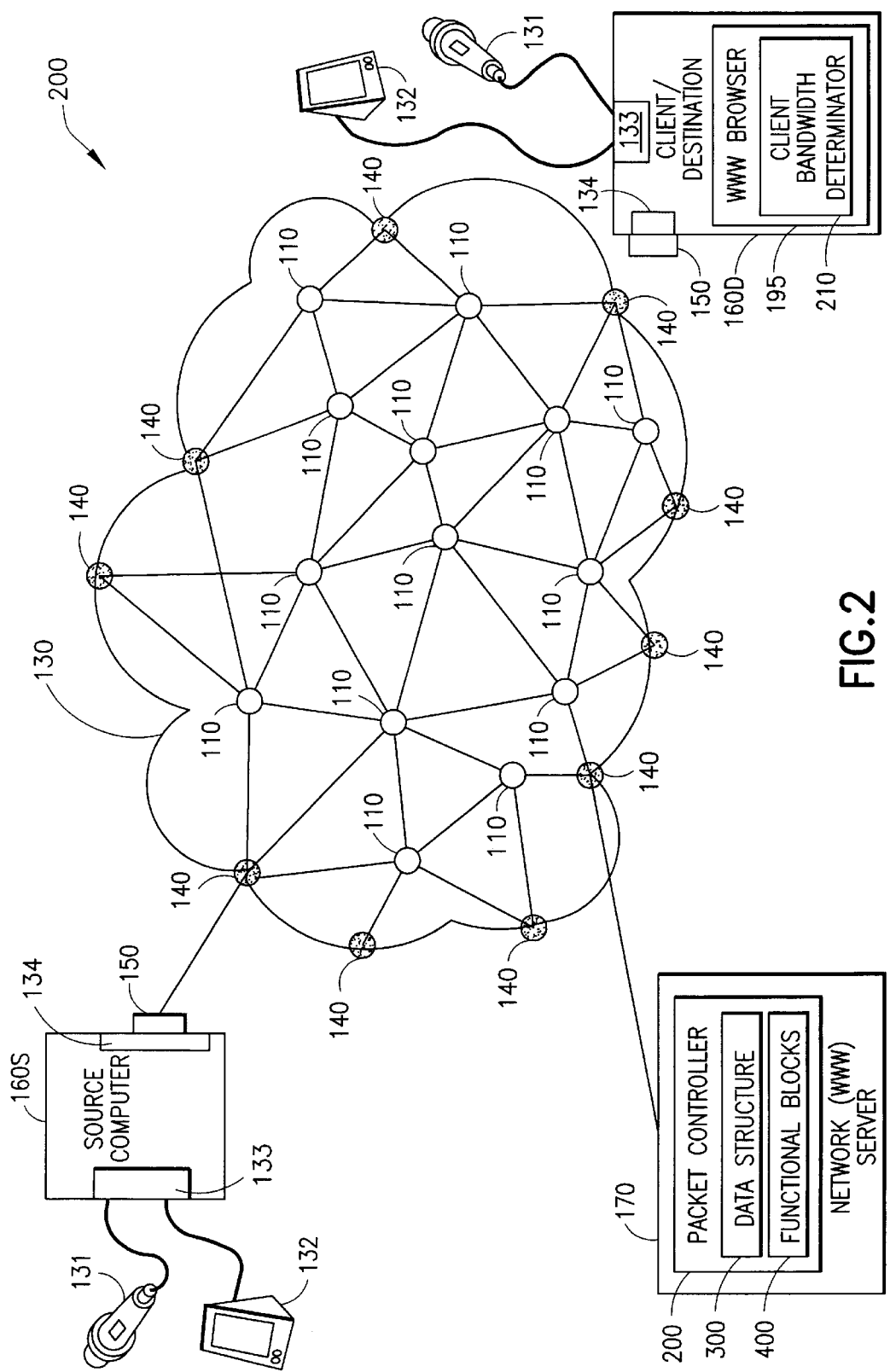
FIG. 2 is a block diagram of a network showing a novel server and client computer connected to the network.

FIG. 2 is a block diagram of a networking system 200 showing a network server 170 (e.g., a World Wide Web server) that contains a novel packet control mechanism (packet controller) 202, a client/destination 160D which comprises an optional novel client bandwidth determinator 210, and a client/source 160S connected to the network 130. Note that components of the networking system 200 that are in the prior art were described in FIG. 1 and have the same numerical designators.

Client 160D includes but is not limited to any of the following computing devices: A computer, like a PC (e.g., IBM Aptiva), workstation (e.g., IBM RS/6000) a labtop/notebook (e.g., IBM Thinkpad), a network computer, or a set top box, a low end device like a hand held device (e.g., a PalmPilot, a smart cellular/desktop phone, or other application-specific devices) or any other general purpose computer. The computer is attached to the network 130 over any type of interface like wireless, dialup using a modem, ISDN, ADSL, cable, etc. The client/destination 160D acts both as a receiver of media like audio, voice and/or video, and as a client 195 to a network server 170. An example client program would be a World Wide Web browser, the client side of a File Transfer Protocol (FTP) connection, a PointCast client, etc. The network 130 could be any packet switched network such as the public Internet or private corporate intranets.

The client 160D optionally contains a client bandwidth determinator 210 that allows local determination of the bandwidth that is available for the network server to download data to the client. Bandwidth includes but is not limited to any one or more of the following parameters: peak rate and average rate at which packets are sent from the network server to the client, maximum burst sizes at which packets can be sent at the peak rate, and the maximum length of the packets. These control parameters are described in more detail in FIG. 3. In the following, we use the term "rate" interchangeably with bandwidth.

The network server 170 can be any of the following: A general data server (e.g. ftp server), a World Wide Web server or proxy, a database server, a mainframe, or any other general purpose computer used in a generally well known server application, etc. It could also be a streaming media (audio or video) server (e.g., RealAudio or RealVideo) that streams multimedia data to requesting clients on demand. It is also possible that the network server is used as a front end for a database server or mainframe and allows such a device to be indirectly connected to the network (e.g., the Internet). Note that the server could transmit data to clients using a variety of transport protocols, e.g., Transmission Control Protocol (TCP) or User Datagram Protocol (UDP).

The network server 170 contains a packet controller 202 that can includes but is not limited to on or more of the following mechanisms that: control the timing and the frequency at which packets are sent to the network 130, control the timing at which packets received from the network are passed to the application, control the size of packets sent to the network, control the size at which data is passed to the application, and control the security features of packets sent out to the network and received from the network. The packet controlling mechanism 202 has a data structure 300 and the functional software blocks 400 that work together to allow efficient association of packets with the controlling mechanisms that should be applied.

Figure 3:
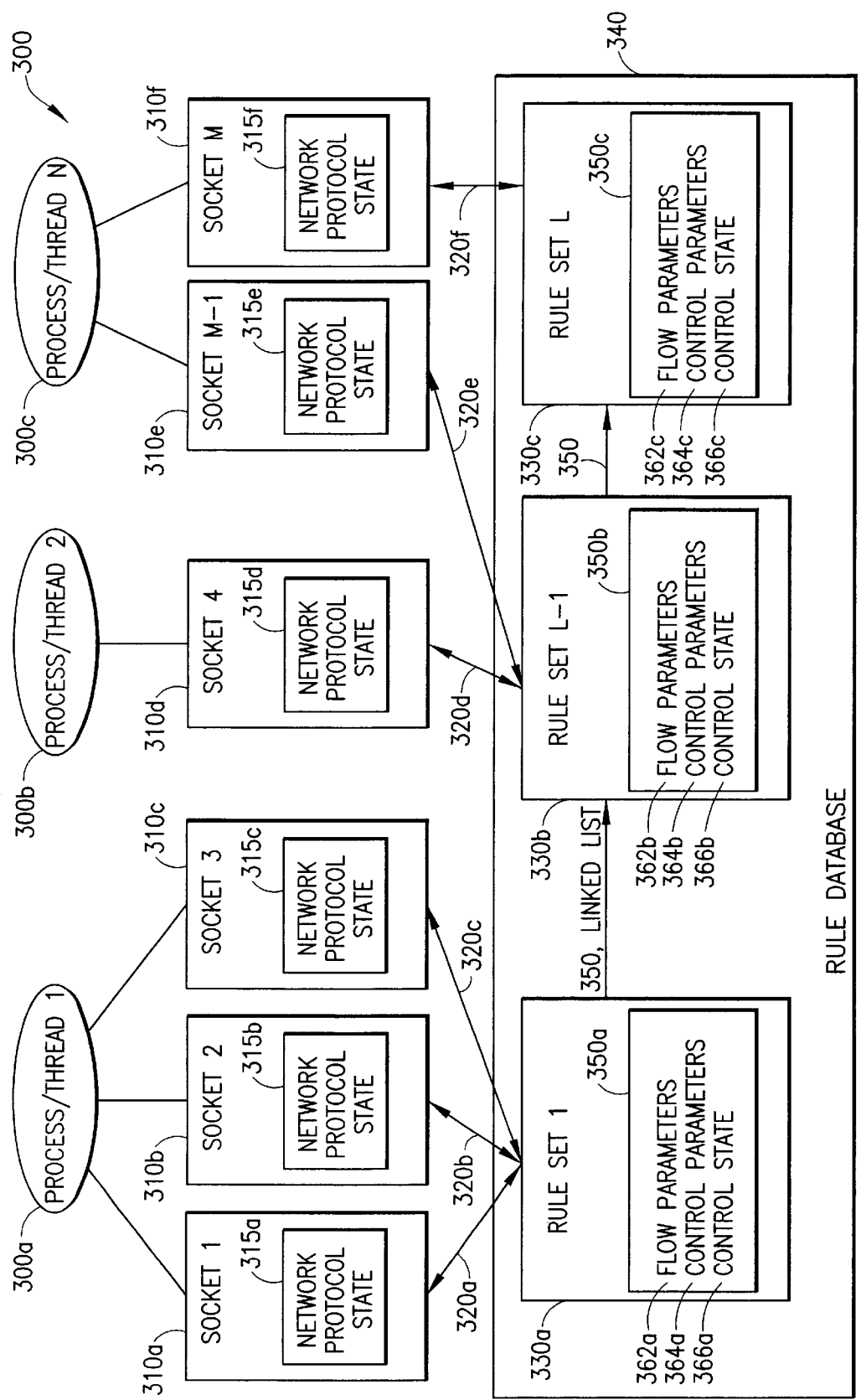
FIG. 3 is a data structure of the present invention showing rule sets associated with socket sets in the server.

FIG. 3 is a block diagram representation of a data structure 300 of the present invention showing rule sets associated with socket sets in the network server 170. A network server like a WWW server software usually creates several processes or threads 300 whose instances are depicted as 300*a*, 300*b*, 300*c* and that implement a network protocol to receive and transmit data (e.g., the HTTP protocol for WWW servers). In the following we will use the term application to include both process and thread.

Each of the applications uses a well defined interface to receive data from the network and transmit data to the network. In most popular operating systems, this interface is called a socket 310, whose instances are depicted as 310*a*–310*f*. In the following we call a socket any abstraction or service of an operation system that allows the sending of data to a network and allows the receipt of data from a network. Therefore, the term socket comprises but is not limited to sockets as used in UNIX and derived operating systems like AIX, FreeBSD, NetBSD, Ultrix, IRIX, Linux and other well known operating systems, OS/2, OS390, and winsock or socket (API) as used in Windows 3.x, Windows 95/98 and Windows NT. A socket 310 usually contains network protocol state 315 that is dependent on the protocol and can comprise but is not limited to any or more of the following parameters: amount of data in the socket buffer, socket blocking or non blocking, high water and low water mark for the socket and other well known parameters. The network protocol state instances are depicted as 315*a*–315*f*.

A rule set database 340 has rule sets 330 whose instances are depicted as 330*a*, 330*b*, 330*c*. In a preferred embodiment, the rule sets 330 are connected using a linked list 350. Iteration through the rule sets is therefore possible by walking down the list. In alternative embodiments, in addition to the linked list, a hash table can be used to find a specific rule more efficiently. The hashing is carried out on parameters such as the source port, destination port, destination address, and source address, and the protocol. Every rule set can be associated with zero or more sockets. An example of hashing is to form a long number out of the source/destination address (usually 32 bits), source/destination port (usually 16 bits), and the protocol type (usually 8 bit), yielding a 104 bit number by just appending the bits of all the field. A hash function, e.g. a modulo function reduces this big number to a smaller set of hash buckets (e.g. 1021 buckets). Since the number of rules in the system is relatively small (smaller than the number of hash buckets) there is a good chance that each bucket contains one rule that can be found using the computationally efficient hash function. More details to hashing can be found in "Introduction to Algorithms" by Corment, Leiserson Rivest, published by Mc Graw Hill.

In a preferred embodiment, a rule set (e.g. rule set instances 330*a*, 330*b*, 330*c*) comprises a data structure 350 depicted as 350*a*, 350*b*, 350*c* comprising any one or more of the following: flow parameters (typically 362), control parameters (typically 364), and state parameters (typically 366).

For example, a rule could comprise a source address X and a destination address Y (these could be IP addresses, IPX or any other well known types of addresses) as flow parameters (meaning that all other flow parameters are wildcards). Therefore, the rule would apply to all transmissions from X to Y and Y to X. As an example, it could also contain the following control parameters: key W, encryption algorithm Z, applicable to outgoing transmissions for every other packet. Therefore, every other packet coming from X and going to Y would be encrypted with encryption key W, using the encryption algorithm Z. In this case, the rule state would consist of a single bit that is toggled with the sending of each packet and that indicates if encryption needs to be applied or not.

Rules can also be classified into types. Rule types comprise but are not limited to any one or more of the following: rule types controlling the frequency and spacing with which packets or data is delivered, rule types controlling security features of a transmission. Rule types can apply on the sending side, controlling packets sent to the network, and on the receiving side, controlling how packets/data is delivered to the application.

The flow parameters 362 describe the extent of the rules, or more specifically which packets need to be controlled. They comprise, but are not limited to, any one or more of the following: source port, source address, destination port, destination address, protocol, the type of sending/receiving application. Any one or more of the former parameters can be a wildcard, denoted by a * (asterisk). As an example, the following flow {source port=*; source address=9.2.23.129; destination port=80; destination address=9.2.24.4; protocol =TCP, application=*}would comprise all TCP connections with IP address 9.2.23.129 and any port on one end, and IP address 9.2.23.4 and port 80 on the other end. That is, source and destination port/address are not related to the direction in which the packets travel that are controlled, but are needed to achieve a mapping with the socket which uses these parameters.

Using that many parameters to describe a flow is usually not possible for systems located in the network (not end systems) that try to implement similar control functions (e.g. a router, or Packeteers PacketShaper). The five parameters source/destination address, source/destination port and the protocol type can be found in packets transmitted by protocols like TCP/IP, UDP/IP and other well known protocols. Therefore, these packets can be identified by a system located within the network. However, the parameter application type is usually not contained in these packets and cannot always be inferred from the other parameters in general. Hence, a router or packet shaper within the network could not get this information by just looking at the packets and could therefore not necessarily perform a classification based on application type.

The control parameters 364 and control state 366 are used to control and manipulate the sending and receiving of packets. In a preferred embodiment, the control parameters 364 comprise any one or more of the following: an indication if the rule applies to the sending side, the receiving side or both sides; an indication, which part of the software (like a function, a procedure, a macro, calling a method on an object or any other well known methods to invoke a piece of software code) needs to be executed; and the parameters necessary for the execution of that code. The control state is usually needed to keep variables between two executions of the respective piece of code.

Controlling and manipulating packets includes but is not limited to any one or more of the following rule types:

Controlling the frequency, the interval, and the size of packets sent to the network and of packets received from the network and being sent to the application, providing mechanisms for privacy, message/packet integrity and authentication.

Figure 7:
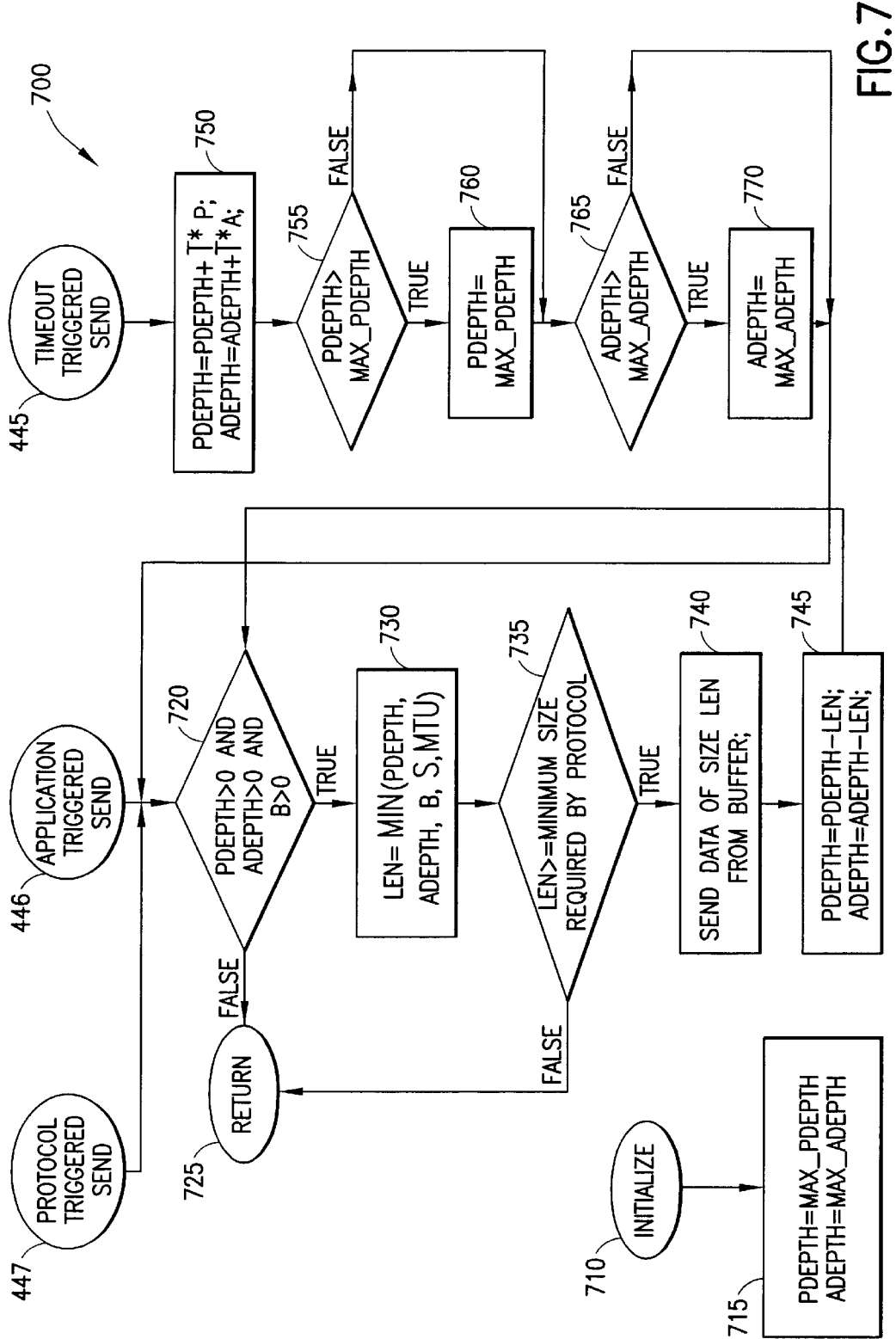
FIG. 7 is a flowchart of the rate shaping process.

In a preferred embodiment, the frequency/interval rule type controls the frequency and the interval of packet delivery by using a "leaky bucket" scheme. The leaky bucket scheme is specified in ITU-T recommendation I.371, "Traffic Control and Congestion Control in B-ISDN", March 1993. The leaky bucket scheme uses 2 leaky buckets; one to monitor the peak rate and one to monitor the average rate. The leaky bucket scheme is used to determine if a packet can be delivered or if the packet has to be delayed. In the case of a rule applying for sending, delaying means leaving the packet in the socket buffer. In the case of a rule applying for receiving, delay means not delivering the packet to the network or not delivering it to the application. A scheme with two leaky buckets allows to ensure that the transmission never exceeds a peak rate, and that a long term maximum average is not exceeded. The detailed implementation of a preferred embodiment with 2 leaky buckets is shown in FIG. 7. The control parameters in this case would comprise a peak rate p, an average rate a, a maximum peak rate buffer depth max_pdepth, a maximum average buffer depth max_adepth, and a maximum packet size S. These parameters are all depicted and described in more detailed in FIG. 7.

As an example, the control parameters are shown that apply to a rule guaranteeing the following: that the maximum bit rate of a transmission does not exceed 5 kb/s, that the average bit rate is limited to 1 kb/s, that the maximum burst of packets (packets transmitted at the peak rate) does not exceed 1024 bytes, and that the maximum packet size is 512. The control parameters in this case are: p=5 kb/s; a=1 kb/s; S=512 bytes; max_pdepth=512 bytes; max_adepth= 1024 bytes, and a pointer to a piece of code that implements the leaky bucket scheme as shown in FIG. 7.

Rules can also be used for controlling security. These rules are called security rule types. The security rule type controls the security of a transmission by applying security features on some or all of the packets. On the sending side such security features include but are not limited to any one or more of the following: encrypting packets with the purpose of guaranteeing privacy to a transmission, adding a message authentication code (MAC) to a message with the purpose of allowing the recipient to verify the integrity of the message, and signing the message with the purpose of allowing a recipient to be able to verify the authenticity of the sender. On the receiving side such security features include but are not limited to any one or more of the following: decrypting a message, or not passing unsecure, non-encrypted messages on to the application, verifying the message integrity and discarding a message/packet if it has been altered, verifying the authenticity of the sender and discarding packets that come unauthenticated.

As an example, control parameters are shown that are used on the receiving side to decrypt and authenticate messages and discard messages that have been altered: Decryption algorithm=DES; hash function=MD5; authentication algorithm=RSA, and a pointer to a software function that can be described with the following pseudocode (the control state would include the actual keys needed like RSA key and DES key):

processPacket(packetPayload) {
   verify the RSA signature of the payload using my RSA key;
   if signature does not match then discard the packet;
   create a MD5 hash;
   compare result with the hash contained in the packet-Payload;
   if it does not match then discard the packet;
   decrypt the packet using the DES key;
   notify application to pick up the decrypted payload;
}

The control state parameters are initialized in step 710 when a new rule is added to the rule database. In the case of frequency/spacing rules, the state is usually initialized to fixed values as shown in FIG. 7, step 715. For security rules, the control state can comprise keys, that can be established using well known key exchange protocols like SSL, ISAKMP/Oakley and other well known key exchange protocols.

This invention forms a bidirectional association between rule sets and sockets since a socket is always involved in sending and receiving packets to and from the network. The bidirectional association 330 is depicted as 320*a*–320*f*. In the example of FIG. 3 the rule set 330*a* is associated with socket 310*a*, 310*b*, 310*c* using the associations 320*a*, 320*b*, 320*c* the rule set 330*b* is associated with sockets 310*d*, 310*e* using associations 320*d*, 320*e* and rule set 330*c* is associated with socket 310*f* using the association 320*f*. The details of how to create, use, and delete these associations are described in FIGS. 4, 5, and 6. Having a bidirectional association between sockets and rule sets is important for the following two reasons:

1. Efficiently finding the sockets associated with a rule set is important when a rule is deleted (as described in step 442 and following of FIG. 4), because all the associations between the rule set and possibly many sockets has to be removed. Instead of having to iterate through a list of sockets to from which socket is associated with the rule set, it is preferable to be able to find the sockets quickly, starting from the rule. This can be efficiently done using the one to many association 320. In a preferred embodiment, this association can be implemented as a linked list to sockets that is stored in the rule set. Each socket only needs to have a single pointer to the rule set.

2. Efficiently finding the rule set associated with each socket is important to find the control state 366 and control parameters 364 when the socket needs to send out a packet., or when a packet is received, since these parameters are needed to manipulate and control the packets (as shown in FIG. 7 for the example of spacing/frequency type of rule). Finding the rule set associated with a socket is also done when a socket disconnects as shown in step 444 and following of FIG. 4.

Figure 4:
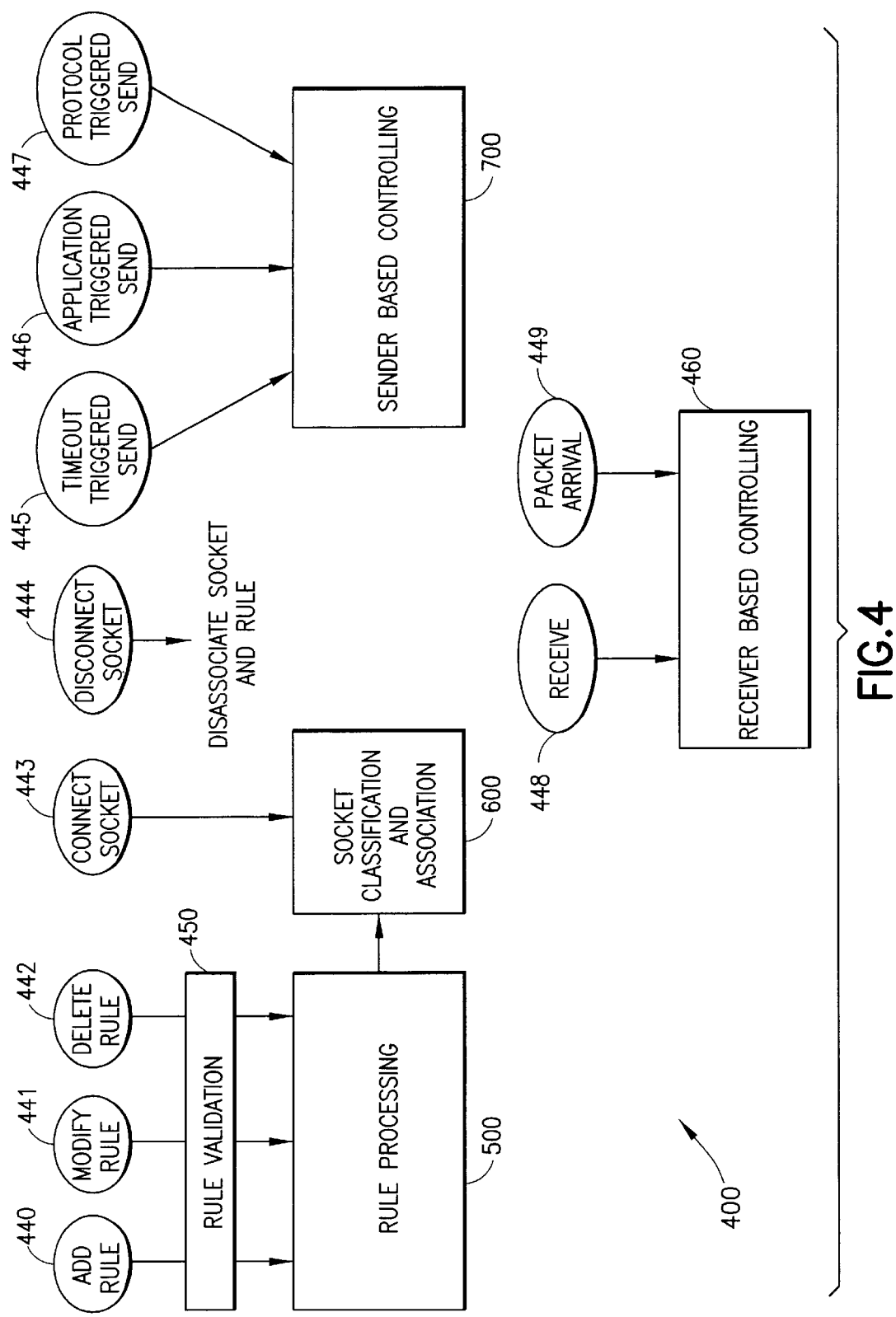
FIG. 4 is a block diagram of the functional blocks of one preferred embodiment of the present invention.

FIG. 4 is a block diagram of the functional blocks 400 of one preferred embodiment of the present invention. In one preferred embodiment these blocks are implemented in software. It shows the functional blocks necessary to create, modify and delete the data structure described in FIG. 3.

Each functional block (represented by a square) contains a clearly defined module. This module is activated by a trigger event represented by a circle. The circles 440–449 represent typical trigger events. Trigger events include but are not limited to any one or more of the following: A trigger event can be caused by an application that manipulates a rule (440–442), an application that changes the state of a socket (443, 444), an event that causes an attempt to send data to the network (445–447), or an event that is caused by the receipt of a packet or that causes an attempt to receive data on a socket (448–449). In a preferred embodiment each trigger event is a call to a function (or more general a piece of software) and the parameters of the trigger event are the parameters that are passed in the function.

The functional block 450 validates if the manipulation of a rule (caused by a trigger event 440–442) is valid. This block is very specific to the environment and the security constraints the invention is placed in. In the following we describe possible policies for rule validation for the trigger events 440–442.

An add rule (440), modify rule (441), delete rule (442) trigger event can be issued by an application (e.g., a WWW server that has determined the available bandwidth to a client), or a management policy that e.g. defines security features for certain flows. In the former case, a network server gets a request for the transmission of data and, based on previous knowledge or by learning how much bandwidth is available on the link to the requester, triggers the adding of a rule 440 that limits the bandwidth used by the transmission. This bandwidth can change during the transmission and the rule can be updated by triggering a modify rule event 441. When the transmission is over, the rule is deleted (trigger event delete rule 442).

In the latter case, e.g. a management policy can be implemented by a user or a software agent, that sets up the security rules or they can be stored in a file together with temporal information on when rules need to be added, changed, deleted. As an example, a policy can restrict clear text transmission of telnet sessions to a server. This is achieved by adding a rule that contains the TCP protocol, three wildcards for the foreign port and the P addresses, and the local TCP port used for telnet. All socket connections going to that port would then mandate packet encryption. Unencrypted packets on the receiving side would for example be discarded by the rule.

The rule validation 450 comprises but is not limited to verifying if a rule is "grammatically correct" (e.g. that there are no nonexistent protocols, negative port numbers, IP addresses of incorrect length, etc.), if the issuer of the trigger has the permission to do so etc. In one security context, manipulating rules might be restricted to a Webmaster, in another context the WWW server application might change the rules itself. Some users/applications might not be allowed to setup rules other might only be allowed to change rules. If the validation is not successful an error is returned to the calling entity, otherwise the trigger event is passed on the rule processing block 500. As an example, the following pseudo code validates the trigger events 440–442.

validate(triggerEvent) {
      IF issuer of triggerEvent is authorized AND
      IF time to apply triggerEvent is ok AND
      IF trigger event is 'grammatically' correct AND
      ...
      THEN pass on trigger event to block 500
      ELSE ignore trigger event and return
    }

The algorithm for the functional block 500 is described in more detail in FIG. 5 and is used to add, modify and delete rules shown in FIG. 3 and the associations they have with sockets.

The trigger event 'connect socket' 443 occurs when an application on the server establishes a TCP connection or when it creates a connected UDP socket. This newly connected socket has then to be matched with every rule to check for a possible necessary association. This is done in the functional block 600 which is described in detail in FIG. 6.

Upon the trigger event 'disconnect socket' 444, which occurs e.g. when a TCP connection terminates or a UDP socket is disconnected, the socket is disassociated from any rule set. Disassociation here means breaking up the bidirectional association 320a–320f shown in FIG. 3. The following pseudo code serves as an example.

disconnectSocket(s) {
      IF socket is associated with a rule set r
      THEN
        find the pointer to socket s in the linked list;
        remove the pointer from the linked list;
        remove the pointer from socket s to rule r
    }

In a preferred embodiment, a timer is used if there are shaping/frequency rules in the system. This timer times out periodically and triggers a 'timeout triggered send' 445. This can be useful e.g. to send out packets that have been delayed before as shown in FIG. 7 step 720 when the leaky bucket test is not true. For other types of rules, a similar timeout mechanism might be used as well.

Attempting to send a packet includes but is not limited to the following: a timeout triggered send 445 occurs when the timer associated with the control mechanism and provided by the operating system fires (i.e., expires). It is enough to have a single timer, that fires and resets itself automatically, in the system. The granularity of the timer determines the maximum frequency with which controlling occurs, in the case where it is the only triggering event. On the other hand, a finer granularity of the timer means that more CPU time is spent iterating over the sockets and applying the control mechanism.

The application triggered send 446 is issued by an application like a WWW server (after a browser has requested to receive a certain WWW page) or data part of an FTP server (after an ftp client has requested a certain file) that tries to send data to the network.

A protocol triggered send is caused by specific protocols. For example, the TCP protocol updates its internal state, whenever it receives an acknowledgment from the peer. An acknowledgment signifies that the peer has successfully received data and that the sender/server might be able to send more. The TCP protocol then evaluates if sending more data is permitted and issues a protocol triggered send.

All three send trigger events (445–447) have to pass through the control mechanism 700, which applies the control function contained in the rule. A specific example, where the control mechanism limits the rate on the sending side, is provided in more detail in FIG. 7.

The receive trigger event (448) occurs when the application wants to receive a message on a socket, while the packet arrival trigger event (449) occurs when a packet arrives from the network for a socket. Both these trigger events have to pass through the control mechanism 460, which decides how the arrived packets are processed with respect to the associated rules before being received by the application. For example, shaping rules for incoming packets may specify that the server accepts no more than a certain rate of FTP or HTTP connection requests (i.e., TCP connection setup packets). Such rules can reduce the possibility of denial-of-service attacks, for example, and also provision a portion of server receive resources under policy control. The associated rules may also specify the rate at which data contained in arriving packets is delivered to the application socket for subsequent receives.

Figure 5A:
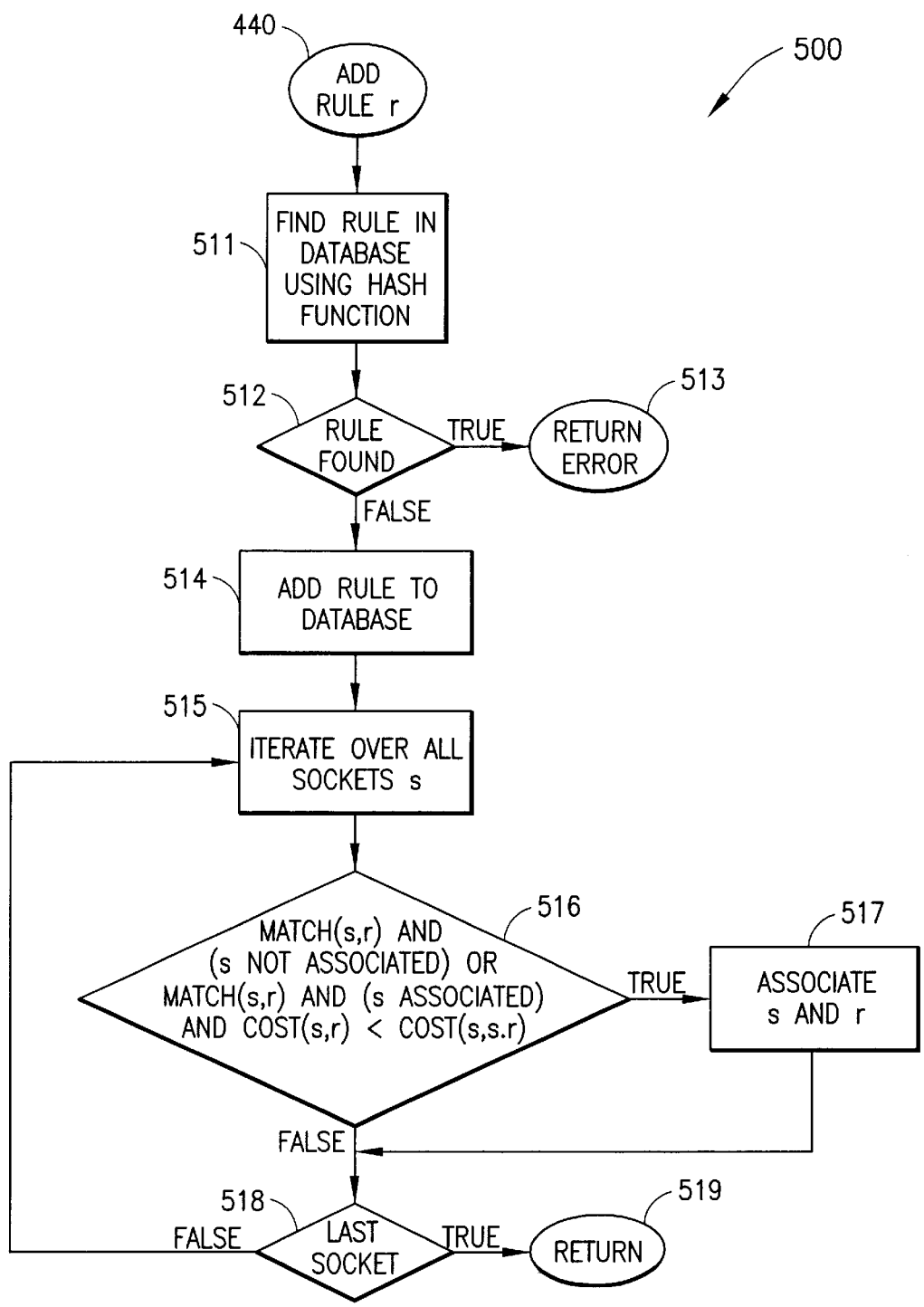
FIG. 5 comprises FIGS. 5A, 5B, and 5C, which are flow charts showing "add rule", "modify rule", and "delete rule" processes, respectively.

FIG. 5 comprises FIGS. 5A, 5B, and 5C, which are flow charts showing how the rule processing functional block handles "add rule", "modify rule", and "delete rule" trigger events. These trigger events and why and when they occurred are described in FIG. 4.

FIG. 5A describes the processing of an add rule event. An add rule event 440 carries control and flow parameters to create a new rule as described in 350 of FIG. 3. Step 511 searches for a rule with identical flow parameters. If the search was successful (branch true of 512) then an error is returned 513, as duplicates are not allowed (instead, if a rule for a flow needs to be changed the modify rule trigger 441 has to be used). If the rule has a different set of flow parameters from all other rules (branch false of 512), it is added to the database in 514. Note that it is possible that two rules with different flow parameters match for the same socket (because of the use of wildcards). In this case, the better matching rule takes precedence and is associated with the socket. This is described in the following.

The following steps show for each socket if it needs to be disassociated with any previous rule and associated with the new rule or be associated with the new rule for the first time. Disassociating a socket from a previous rule to associate it with a new rule is necessary if the new rule has flow parameters that match better with the socket parameters than the flow parameters of the old rule. To test for a better match a cost function is defined that determines how costly a match is. Every rule in the system should always be associated with the socket that yields the lowest cost match. Finding the lowest cost match is described in detail in FIG. 6 where the reverse initial situation exists: a socket needs to be matched with the best matching rule instead of a rule needing to be matched with all sockets that match.

Step 515 shows that an iteration over all sockets is performed. Most operating systems keep a linked list containing all sockets. Iterating over the sockets means just following the elements of the linked list. Alternately, a hash table may also be constructed to efficiently identify the set of sockets that most closely match the flow parameters in the new rule. In the following the current socket is denominated as socket s.

Step 516 checks if the new rule r needs to be associated with the current socket s under consideration. Two functions are defined (match and cost) which are used in the test. The function match(s,r) is true if for a socket s if the IP source address, IP destination address, source port, destination port, protocol, and application type are identical to the corresponding fields in the flow parameters of the rule with one exception. An * (asterisk) in a field in the flow parameters is always considered to be a match as shown in the following pseudo-code match(s,r) {
  IF (s.source_address =r.source_address OR r.source_
    address=*) AND
  (s.destination_address =r.destination_address OR
    r.destination_address=*) AND
  if (s.source port=r.source_port OR r.source_port=*)
    AND
  (s.destination_port =r.destination_port OR
    r.destination_port=*) AND
  s.protocol=r.protocol OR r.protocol=*)
  THEN return TRUE
  ELSE return FALSE
}

There are two cases which are treated differently for a match. If the socket was not associated with a rule before and the flow parameters match, step 517 is performed. If the socket was associated with a rule before, then step 517 is only performed if the new match is better. In other words the new match is better if the cost function for the socket and the rule is lower than the cost function for the socket and the rule it used to be associated with. Step 517 breaks up any old association (if any) by associating the current socket s with the new rule r. The cost function is shown in steps 615–645 and the value it produces is contained in the variable localCost at step 645.

Step 518 checks if the iteration has covered all sockets in which case it is stopped 519 or if there are more sockets left in which case step 515 will find the next socket to be evaluated.

FIG. 5B describes the processing of a modify rule trigger event. The modify rule trigger event is described in FIG. 4. The modify rule event 441 identifies the rule and the new flow and/or control parameters. Step 531 locates the rule using a hash function over the IP source and destination addresses, the source and destination ports, the protocol, and the application type. If the rule is not found (step 532) an error is returned in 533. If the rule is found, the control parameters 364 contained in the data structure 350 of the found rule are updated in 534 using the parameters of the trigger event and a return occurs at 535. After updating of the control parameters, the new control state values have to be verified for correctness. An example where control state parameters need to be updated is shown in FIG. 7.

FIG. 5C describes the processing of a delete rule trigger event 442. As parameters it contains the flow parameters that uniquely identify the rule that has to be deleted. In step 551, the rule is located in the rule database using the hash function over the IP source and destination address, and the source and destination port for this protocol. If the rule is not found in test 552 then an error is returned in 553. If the rule has been successfully located, it is disassociated from all sockets and removed from the database at 554. For all the sockets that have been associated with the rule, at 555 the classifier described in FIG. 6 is used to see if there are any other rules that now match best with the disassociated sockets and a return occurs at 556.

Figures 2, 6:
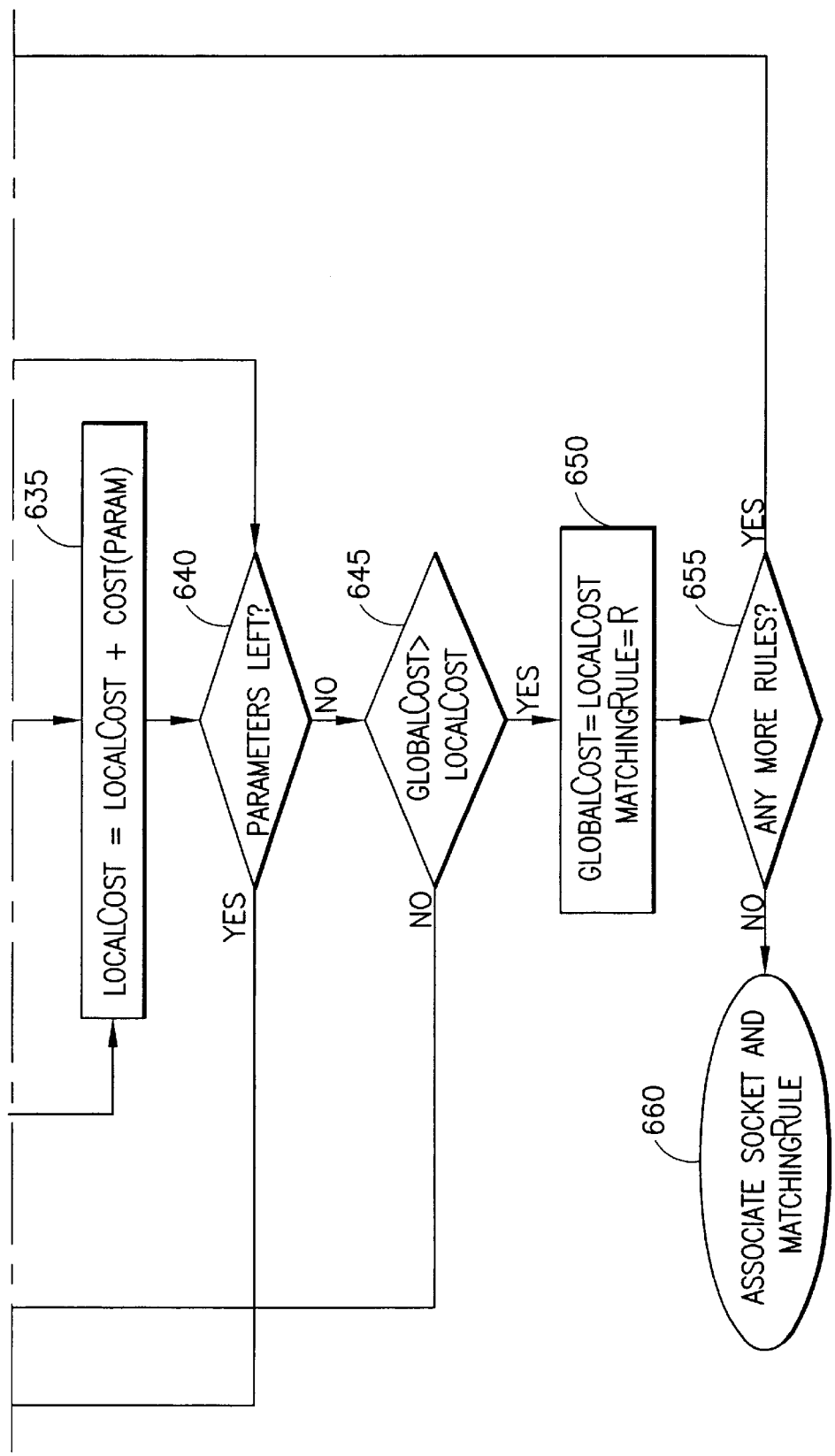
FIG. 6 is a flowchart showing the process how sockets are classified and associated with rules.

FIG. 6 is a flowchart showing a rule classification and association process 600 that is used to create bidirectional associations 320 between rule sets 330 and sockets 310. It is triggered by a request 443 to classify a newly connected socket and associate it with the best matching rule. The request comprises the following flow parameters {source IP address, destination IP address, source port, destination port, protocol, application} depending on how the system is setup.

In step 605 local variables globalCost and matchingRule are set to zero.

In this preferred embodiment we find the best matching rule by iterating over all the rules and picking the rule with the least cost matching function as shown in steps 620–640. In another embodiment, the hash function might be applied first for the socket parameters as they are, next to the socket parameters where one parameter is replaced with an asterisk (do this for every parameter), next where 2 socket parameters are replaced by asterisks (do this for all possible combinations) then 3,4 and 5 parameters replaced with an asterisk. Depending on how many rules generally are in the database this might be a slower or faster approach to find the best matching socket. Either of the approaches are done in step 610.

The following steps 615–640 determine if the selected rule matches the socket and what the cost associated with the match is. The cost function can yield three types of values: The value zero for a perfect match, meaning that none of the parameters in the rule was a wildcard (asterisk). It can yield a no match as shown in step 630 (no flow). Lastly, it can yield a positive, non zero value that signifies a costlier match the higher the number is. The cost function allows to parameterize the cost of a wildcard match by associating a specific cost to each of the parameters with which the connect function is triggered.

In step 615 the local variable wildcard is set to zero. Step 620 starts with the choosing, of the first of the 5 parameters shown in the box. In subsequent rounds all the parameters are picked one after another. The parameters can be chosen in any order.

Step 625 tests if the corresponding flow parameters of the rule is a * (asterisk). Only if the rule contains a wildcard, the cost function has to be used to determine the overall cost of an eventual match. If the test of 625 is false then the fields of the rule and the socket are compared for equality in step 630. If the two fields are different, the rule does not match the socket and any fur matching for this rule is not necessary. In this case, the next rule is considered for matching in step 610. If the two fields are equal step 640 is executed next. If in test 625 the rule field contains a * (asterisk) the cost for such a match is added to localCost of matching this rule with the socket. The cost for a wildcard match can be different for each field of a rule and allows to give priorities in case there are two rules which have an equal number of wildcard matches but where the association with one rule is preferred over the association with the other. The cost of a wildcard match for each field can be statically stored and is obtained in step 670. Step 640 checks if there are more fields that need to be compared. If so, then the next field is selected in step 620. If there are no fields left, the socket and the rule have been tested for a matching in all fields and the testing was positive. In the following step 645 the cost of this latest match is compared with the cost of the best match so far. If the cost of this (local) match is smaller than the cost of the best match (global) so far, then this match replaces the former best (global) match in step 650. Otherwise the next rule is examined for matching. In step 650 the new best match is stored in matchingRule, together with the cost associated with that match (globalCost). Note that the cost of any match that did not involve a wildcard is zero. Since there is only exactly one such match possible (rules with identical flow parameters are not permitted), there is a unique best match possible. Test 655 checks for more rules that have not been examined yet. If there are more rules, the next rule is examined in step 610. If there are no more rules, the socket can be associated with the best matching rule that is contained in the variable matchingRule 660. Note that it is possible that no rule matches a socket and that in this case the socket is a prior art socket that is controlled by any rule.

FIG. 7 is an example of a rule control mechanism 700 that implements rate control at the sending side. It could also be applied to control the rate at which packets are passed to the application on the receiving side. It allows to reduce the rate between the network server and the client. This can be useful if the client has other concurrent sessions, (e.g. audio/video sessions) that might be impacted by the server-client transmission if it is not rate controlled.

The packet shaping process is based on a 'leaky bucket' scheme, that uses two leaky buckets. One leaky bucket is used to monitor conformance to the peak rate p, the other one is used to monitor conformance to the average rate a. In the following an intuitive explanation of one leaky bucket is given. The leaky bucket has a certain capacity to store credits. These credits are measured in bytes. Whenever the shaping timer expires, both leaky buckets are filled with a different amount of credits. The amount of credits added to the peak rate monitoring bucket is T*p, the amount added to the average rate monitoring bucket is T*a where T is the interval of the shaping timer. This is shown in step 710 and explained in more detail below. The bucket cannot be filled more than its maximum capacity (max_pdepth and max_adepth for peak and average rate buckets, respectively). At any time, it is only possible to send as much data as is accounted for in both buckets (cannot send more than the credit available). If data is sent, the credit of both buckets (pdepth, adepth) is decrement by the amount of data sent.

As shown in FIG. 4 the packet shaping process can be triggered by 3 different events. The most common trigger event is an application trying to send data to the network using a connected socket. This is the trigger event 446. Another trigger event that involves the same order of processing, is a protocol triggered event 447. Such an event could be a timeout of the protocol used to transmit data (e.g. in the case of TCP, a retransmission timeout causes the TCP protocol to retransmit data), or feedback from the network or the peer that it is ready to receive more data (e.g. in the case of TCP an Acknowledgment from the receiving end, that opens the sending window and can cause new packets to be sent). The third trigger event is caused by the control mechanism itself. It occurs when the control timer expires (step 445) and causes a filling of the leaky buckets in the case where the rule implements a control mechanism for the rate. Whenever the shaping timer expires the following steps will be performed for all rules. This is achieved by iterating over the linked list containing the rule database shown in FIG. 3. Step 750 replenishes the content of both buckets. The peak leaky bucket is incremented by T*p, the average leaky bucket by T*a. While in the preferred embodiment, the value of "T" is the same for both the peak leaky bucket and the average leaky bucket, each bucket, could have different values of "T". Since T is associated with the timer, this would mean that more than one timer has to be employed. Steps 750–770 insure that the new content of the bucket does not exceed the maximum bucket size. Step 755 tests if the new content (pdepth) is larger than the maximum depth of the bucket (max_pdepth). If the test is true, pdepth is reduced to the maximum size allowable in step 760. Steps 760 and 765 check for an overflow of the leaky bucket monitoring the average rate and reduce the depth (adpeth) to the maximum allowable for the average leaky bucket. Then the processing merges with that of 446 and 447 in step 720. Reducing pdepth and adepth to their maximum values does not impact the packets since these parameters only indicate the amount of credits contained in the respective leaky bucket. Therefore, no packets are discarded in the process.

The first step 720 in the actual shaping process is to verify if new data can be sent to the network without violating the shaping rule. The test is true only if both leaky buckets contain credits (i.e. pdepth>0 and adepth>0) AND if the socket buffer contains data to send (b>0). If any of these conditions is not met the shaping mechanism returns (725). The socket buffer does not always necessarily contain data when the shaping mechanism is invoked. For example, after a timeout triggered send the shaping mechanism is invoked but the application might not have any data to send.

Step 730 determines the maximum size of the packet that can be sent out. The maximum size is the minimum of the following parameters: The amount of credits (bytes) available in any of the two leaky buckets (pdepth, adepth), the amount of data in the socket buffer that is ready to be sent out (b), the maximum size of the packet as specified in the shaping parameters (S), and the maximum transmission unit as defined in the network protocol (MTU). The minimum of these parameters defines the length of the packet that can be sent out.

Step 735 then tests if the network protocol allows to send a packet of that size. For example, if the network protocol that is used is UDP (a datagram protocol) then the protocol does not allow to fragment a datagram into two UDP packets. In this case, the shaping mechanism returns (725) and has to wait until enough credits have been accumulated in the leaky buckets that the whole record can be sent out in one shot. Note, that a misconfiguration of the packet size S could prevent any large UDP packets from being sent. Therefore, setting up a shaping rule needs careful consideration with respect to the network protocol it applies to.

Step 740 consists of the actual sending out of a packet of length "len" to the network, involving all lower network protocol layers. In addition, the packet headers also have to be formed according to the network protocol used. In step 745 the leaky bucket state is updated to account for the packet that has been successfully sent. The number of credits in the average and in the peak leaky bucket is reduced by len. Steps 720–745 are then repeated until the condition 720 is no longer true in which case the shaping process terminates the current round.

For the flow diagram comprising the timeout triggered send, a plurality of sockets might be ready to send data at step 720. If the notion of fairness among sockets is not important the set of sockets associated with one shaping rule might be iterated always in the same order. In general, this allows the sockets that appear early in the iteration, to send more data than sockets appearing later in the iteration if the rule implements a temporal constraint (intuitively, the sockets early in the list use up all the credits). This is not a problem for WWW applications where it does not matter if one part or the other within a Web site is built up faster. It is more important that the aggregate rate is not exceeded.

In an embodiment, where fairness is important (i.e. all sockets are supposed to get an equal share of the total shaping rate), a better strategy is to iterate over the socket set associated with one rule in the same order, starting with a different socket in each round. This can be easily implemented by marking the socket that is supposed to send first in the next round. If the socket has data to send in the next round the marker is advanced to the next socket, otherwise the marker remains.

Figure 8:
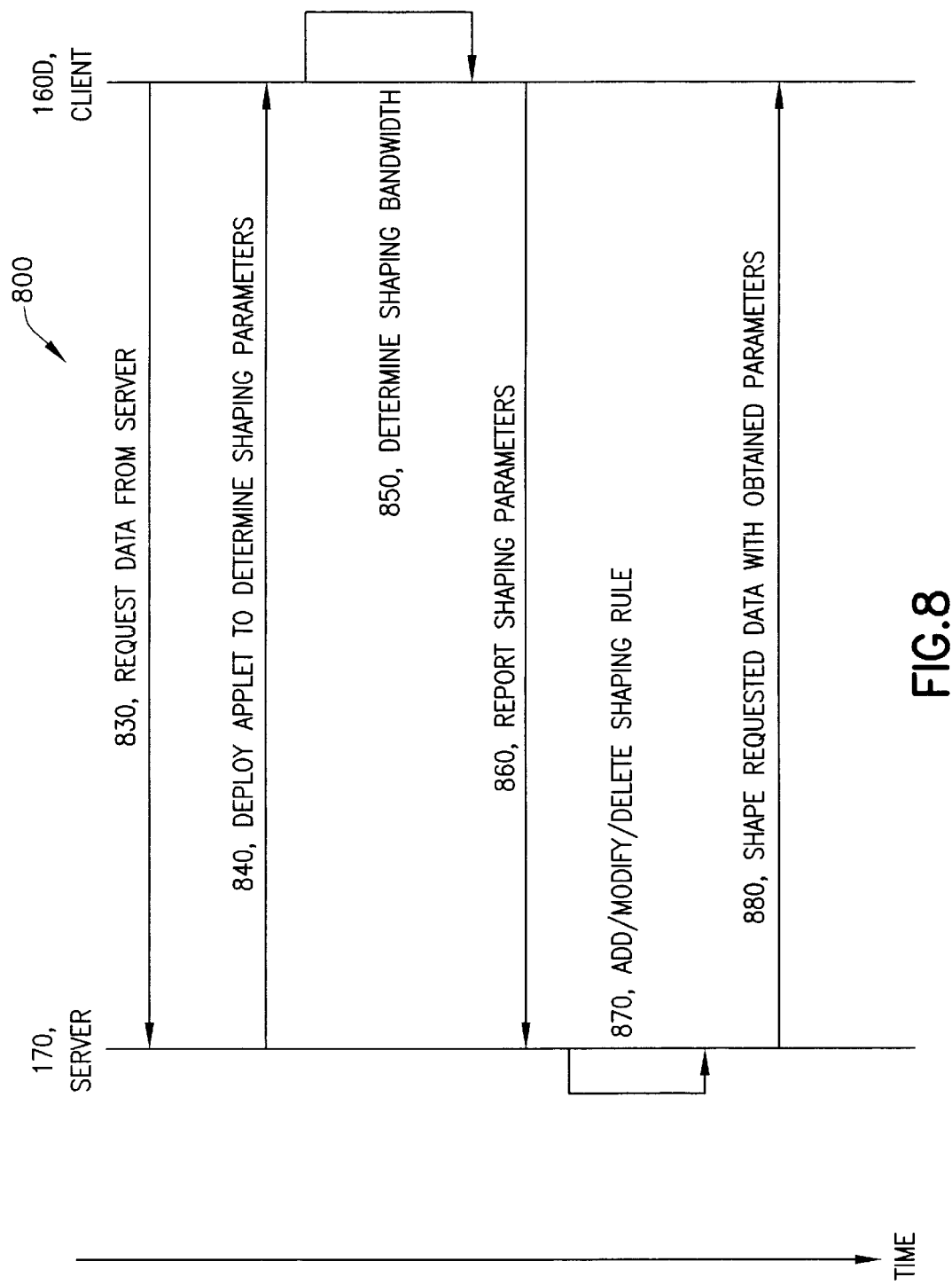
FIG. 8 is a diagram of the message flow between the client and server communicating client constraints.

FIG. 8 is a diagram of the message flow 800 between the client and server communicating client constraints. Client constraints can be divided into two categories: constraints of the network bandwidth between the client and the peer it is communicating with, and constraints within the client itself. The latter constraints comprise any one or more of the following: limited memory and limited CPU power as they are common in thin clients, set-top boxes, and hand held devices like cellular phones, pagers, palmtops, etc. For a server to setup a new rule that controls the rate of a connection, it has to have some information what reasonable shaping parameters should be.

In one preferred embodiment, the network server would try to measure the bandwidth that is available between the server and the client. This can be done actively by sending probes into the network, or passively by monitoring the packets that are sent to the client anyway. By keeping track of past available bandwidth, the current bandwidth can be estimated.

In another embodiment, the network server 170 and the client source 160S are collocated. The client source knows the parameters of the transmission that is in process between itself and the client destination 160D. It might also have some prior information about the bandwidth with which the client is connected to the Internet. It then passes this information on to the network server which sets up a new shaping rule to limit the transmission rate between itself and the client/destination to guarantee a good quality of the transmission between the two clients.

In another embodiment, the client/destination 160D and the server 170 communicate to enable the server to setup reasonable shaping parameters. This communication 800 is shown in FIG. 8. It contains a server 170 that communicates with the client/destination 160D to determine the parameters for the shaping rule. The communication usually starts with a request 830 from the client. This can be an HTTP request like GET, or POST, or a request for data within an FTP session. When the server realizes that it is involved in a session with this client it deploys an applet 840 to determine the client constraints. A detailed description of the applet process is given in FIG. 9. This step could be omitted if the client side already has the necessary software (e.g. cached or stored from a previous session, or it could be contained as a plug-in within the WWW browser, etc.).

In another embodiment the server side would just offer a form-like web page where the user can annotate the maximum bandwidth with which he wishes to communicate with the server.

In another embodiment, the server memorizes the bandwidth available for a transmission. When the transmission stops and a new transmission starts to the same client, this information can be used to set up a new shaping rule. Another possibility is to keep track of the available bandwidth to clients that are 'close' to a specific client. Closeness could be measured by the number of bits in the IP address prefix that are equal (the longer the common prefix, the closer they are). In this case, every client within a certain range of a client, whose available bandwidth is known, would be treated alike.

Determination of the shaping parameters is indicated in 850. It is described in more details in FIG. 9. Once the shaping parameters are determined, they are communicated to the server in 860. The server can react in three ways when it gets the shaping parameter report indicating that client constraints exist. These are indicated with 870:

If no prior shaping rule has been in place a new rule would be set up (using the trigger event 440) that limits the flow (all the connections) between the server and the client. Such a rule would typically look like {source address=server address; source port=*; destination address=client address; destination port=*; application=*;+shaping parameters}.

If a shaping rule is already in place (due to an earlier or ongoing parallel session with the client) this rule might have to be modified using a trigger event 442. The shaping parameters would be adapted according to the new bandwidth constraints.

If the server realizes that the bandwidth constraints have disappeared, (e.g. the client has terminated a voice over IP call with a peer) the rules pertaining to the client can be deleted using a trigger event 442. This allows the server to make full use of the existing bandwidth between itself and the client.

Finally, the server sends the requested data in 880, shaped according to the best matching rule. Note that the FIG. 8 is only an example of one possible message flow. For example, the report of shaping parameters 860 could be repeated periodically or whenever there is a significant change in bandwidth. It is also possible that the server starts sending data right away 880, using a shaping rule of a previous session with the same client.

Figure 9:
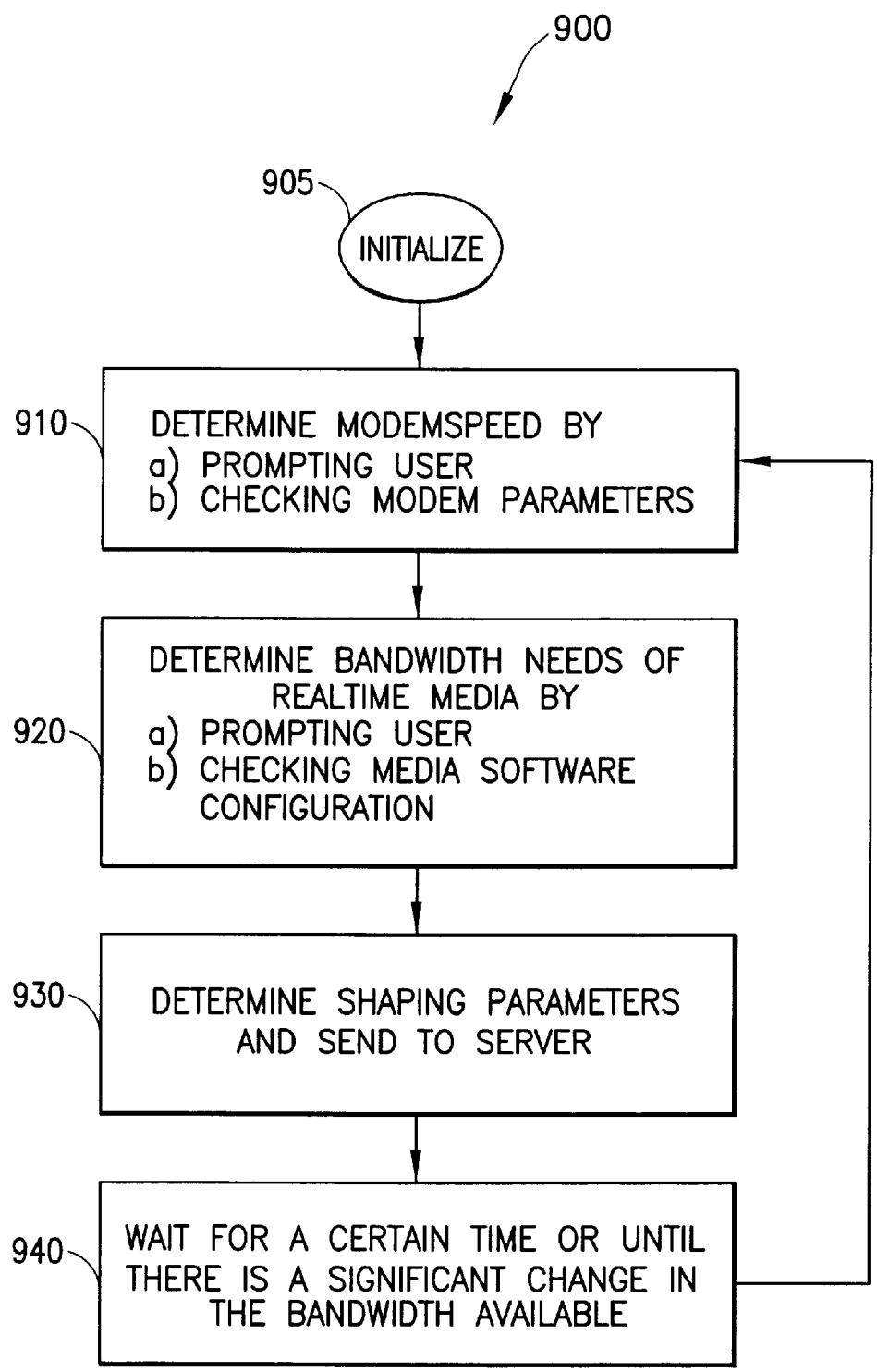
FIG. 9 is an optional client process that is executed on the client to communicate client constraints to the server.

FIG. 9 is an optional client process 900 that is executed on the client to communicate client constraints to the server. This is necessary for a network server to determine the shaping parameters. The client process is installed permanently or is deployed from the server as described in FIG. 8. It provides a more detailed description of step 850 in FIG. 8. The optional client process 900 impacts the server 170 in so far that the communication of client constraints can trigger the events 440–442 in FIG. 4.

After initialization 905, the client determines the bandwidth (step 910) with which it is connected to the network. This can be done by detecting the modem parameters or by prompting the user for the corresponding input. The client process then determines the bandwidth used by the real time media transmission that is supposed to be protected from ordinary data transmission in step 920. This can be done by analyzing the media software configuration or by prompting the user.

The 'free' bandwidth, i.e. the bandwidth available for other transmission like downloading data from the network server ist then determined in step 930. As an example, if the average bandwidth used by the media transmission is 10 kbit/s and the modem speed is 28 kbit/s the 'free' bandwidth is 18 kbit/s. Usually, packets do not arrive nicely spaced out. Therefore, the free bandwidth should be reduced to compensate for variation in the arrival of packets for both sessions to guarantee a reasonable delay and delay variation for the media transmission.

Steps 920 and 930 can also be determined by analyzing the quality of the media transmission. In this case, the client process keeps track of the average delay of media transmission packets (e.g. by using the statistics provided by the Real Time Control Protocol RTCP). When the delay increases, this signifies that the available bandwidth from the server should be decreased. When the delay decreases, the available bandwidth from the server can possibly be increased. It is even possible to give the full bandwidth to the server in cases where the media transmission is paused temporarily (e.g. pause within a phone call, pause due to rewinding of a video tape on the client/source, etc.).

In step 940, the available bandwidth is reported to the server. The client program can calculate the shaping parameters either directly, or provide the server with the acquired information. Reports might be sent in regular intervals or only when the available bandwidth between the client and the server changes significantly.

In the preceding descriptions shaping rules have been explained in greater detail (e.g. in FIG. 7). Note, that a rule can be used for other purposes as well. The main goal of a rule is to control the behavior of a set of sockets using a bidirectional association. Above, different behavior was related to setting different bandwidth limits to different sets. Actually, different rules pertaining to the same flow can form a rule set.

Other uses of this invention include, but are not limited to, the following.

Rate shaping a flow (a set of network sessions) with the purpose of reducing the probability that subsequent packets of the same sessions get lost due to a buffer overflow in or at the edge of the network. For streaming applications, where video and/or audio is sent while being simultaneously played out at the client side, limiting the bandwidth and pacing out the packets can limit the necessary buffers at the receiving (client) end. In addition, experiments show that rate shaping (pacing out the packets in constant intervals) reduces the average packet loss rate, the average packet delay, and the average packet delay variations.

A network server might be subject to security considerations. For example, a company WWW server might be accessed from employees within the firewall, but also from employees working remotely, outside the firewall. Setting up rules allows to selectively encrypt, authenticate flows to outside employees to guarantee privacy and authenticity. Instead of defining bandwidth parameters, the shaping parameters would consist of security parameters like the encryption technology, the encryption keys, etc.

Rate shaping a flow (a set of network sessions) with the purpose of differentiating priorities of packets between different flows. This can be useful e.g. to give faster access to customers who order products over a web site, than to visitors of the web site who are just looking for general information. An end system usually has access to information that a router in the network does not possess. Therefore, it is possible to describe a flow based on the application type as specified at the end system. The flow parameters of a rule do not necessarily need to contain all parameters. It is always possible to put a wildcard value in an unknown parameter. Therefore, it is possible to give priority to a secure WWW transaction (listening on port 443) over a regular WWW transaction (listening on port 80) by limiting the bandwidth of all flows using source port 80.

We claim:

1. A server connected through one or more network interfaces to one or more networks, each of the networks connected to one or more clients, the server having one or more memories and one or more central processing units (CPUs) and further comprising:

one or more applications executed by one or more of the CPUs, each application using one or more sockets connected to the networks to communicate over the networks;

one or more rule sets containing one or more rules; and one or more socket sets of one or more of the connected sockets, each of the socket sets associated with one of the rule sets, the rule set controlling one or more packets sent by the applications on each of the sockets in the associated socket set;

wherein the rule set controls the timing of the sending procedure of the packets to the network or the sending of received packets to the application on any socket in the associated socket set in one or more of the following ways: limiting a peak rate of delivered packets, limiting size of a burst of packets delivered at the peak rate, and limiting size of sent packets.

2. A server, as in claim 1, where the association between a rule set and a socket is based on any one or more of the following attributes of the socket: a source address of the server, a destination address of the client, a source port of the server, a destination port of the client, a protocol type, and an application type.

3. A server, as in claim 1, where the rule set controls the security of the packets sent on any of the sockets in the associated socket set in one or more of the following ways: using an encryption key, using the encryption technique, how often to encrypt, packet authentication, how often to authenticate packets, and method of authentication, when to prevent packet sending.

4. A server, as in claim 1, where the rule set controls all the packets sent from any socket in the associated socket set in the same way.

5. A server, as in claim 1, where the association between one or more of the socket sets and the rule set is bidirectional.

6. A server, as in claim 1, where the rule set controls the temporal spacing of successive packets to slow down the transmission.

7. A server, as in claim 6, where one of the applications is one of the following: a video stream, an audio stream, a video and audio stream, and a large data stream.

8. A method, executed by a computer system, the computer system having one or more network connections to one or more networks, the method comprising the steps of:
- verifying that there is information in the form of packets to be communicated between one or more applications executing on the computer system over one or more of the network connections;
- verifying that the information can be communicated as determined by one or more rules in a rule set associated with one of the network connections, wherein the rule set is accessible for associating with one or more of the network connections;
- communicating the information if the rules in the rule set are satisfied; and
- wherein rule set controls the timing of a sending procedure of the packets to the network or the sending of received packets to an application on any socket in an associated socket set in one or more of the following ways: limiting a peak rate of delivered packets, limiting size of a burst of packets delivered at the peak rate, and limiting size of sent packets.

9. A method, as in claim 8, where the information is modified to modified information if the rules are not satisfied, the modified information satisfying the rules.

10. A computer connected through a connection on one or more network interfaces to one or more networks, the computer comprising:
- means for verifying that there is information in the form of packets to be communicated between one or more applications executing on the computer system over one or more of the network connections;
- means for verifying that the information can be communicated as determined by one or more rules in a rule set associated with one of the network connections, wherein the rule set is accessible for associating with one or more of the network connections;
- means for communicating the information if the rules in the rule set are satisfied; and
- wherein the rule set controls timing of a sending procedure of the packets to the network or the sending of received packets to an application on any socket in an associated socket set in one or more of the following ways: limiting a peak rate of delivered packets, limiting size of a burst of packets delivered at the peak rate, and limiting size of sent packets.

11. A server connected through one or more network interfaces to one or more networks, each of the networks connected to one or more clients, the server having one or more memories and one or more central processing units (CPUs) and further comprising:
- one or more applications executed by one or more of the CPUs, each application using one or more sockets to communicate over the network;
- one or more rule sets of one or more rules, one or more of the rules containing one or more client constraints; and
- one or more socket sets of one or more of the connected sockets, each of the socket sets associated with only one of the rule sets, the rule set controlling one or more packets sent by each of the sockets in the associated socket set.

12. A server, as in claim 11, where the client constraints include any one or more of the following: a client with limited access bandwidth to the network, a client with limited bandwidth to the server, one or more other network sessions involving the client, a client with limited computational power, and a client with limited memory.

13. A server, as in claim 11, where the client constraints are communicated to the server from a client constraint determinator that executes on the client to determine the client constraints.

14. A server, as in claim 11, where the client constraints are communicated to the server from an agent computer that has a concurrent second session with the client.

15. A server, as in claim 11, where the client constraints are assumed or extrapolated based on previous observations, or communication with clients with similar constraints, or clients located close to each other.

16. A server, as in claim 11, where the client constraints are determined using human input.

17. A server, as in claim 11, where client constraint is a client bandwidth constraint and the rule set controls the packets to be sent slower because the client has concurrent audio and/or video sessions.

18. A server, as in claim 17, where the rule set controls using any one or more of the following shaping mechanisms: limiting the average rate of sent packets, limiting the peak rate of packets, limiting the size of the burst of packets that are sent out at the peak rate, and limiting the size of the packets sent.

19. A server, as in claim 11, where the client constraints are thin client constraints.

20. A server, as in claim 19, where the thin client constraints are imposed by any one or more of the following thin clients, that are tier-zero devices: a set-top box, a hand held device, a Palm Pilot, a Web appliance, and a Web-based application device.

21. A server connected through one or more network interfaces to one or more networks, each of the networks connected to one or more clients, the server having one or more memories and one or more central processing units (CPUs) and further comprising:
- one or more applications executed by one or more of the CPUs, each application using one or more sockets connected to the networks to communicate over the networks;
- one or more rule sets containing one or more rules, wherein the rule sets are data structures for associating with one or more sockets;
- one or more socket sets of one or more of the connected sockets, each of the socket sets associated with one of the rule sets, the rule set controlling one or more packets sent by the applications on each of the sockets in the associated socket set; and
- wherein the rule set controls the timing of the sending procedure of the packets to the network or the sending of received packets to the application on any socket in the associated socket set in one or more of the following ways: limiting a peak rate of delivered packets, limiting size of a burst of packets delivered at the peak rate, and limiting size of sent packets.

* * * * *